(12) United States Patent
Quehenberger et al.

(10) Patent No.: US 10,047,802 B2
(45) Date of Patent: Aug. 14, 2018

(54) CLUTCH

(71) Applicant: Magna Powertrain GmbH & Co KG, Lannach (AT)

(72) Inventors: Johannes Quehenberger, Raaba (AT); Johann Willberger, Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 122 days.

(21) Appl. No.: 15/038,302

(22) PCT Filed: Nov. 21, 2014

(86) PCT No.: PCT/EP2014/075291
§ 371 (c)(1),
(2) Date: May 20, 2016

(87) PCT Pub. No.: WO2015/075183
PCT Pub. Date: May 28, 2015

(65) Prior Publication Data
US 2016/0290412 A1 Oct. 6, 2016

(30) Foreign Application Priority Data

Nov. 25, 2013 (DE) .......................... 10 2013 224 047
May 22, 2014 (DE) .......................... 10 2014 209 809

(51) Int. Cl.
*F16D 11/06* (2006.01)
*F16D 11/16* (2006.01)
(Continued)

(52) U.S. Cl.
CPC .............. *F16D 11/16* (2013.01); *F16D 11/06* (2013.01); *F16D 27/102* (2013.01);
(Continued)

(58) Field of Classification Search
CPC ........ F16D 11/16; F16D 11/06; F16D 27/102; F16D 2500/1025; F16D 48/064
See application file for complete search history.

(56) References Cited

U.S. PATENT DOCUMENTS

| | | | | |
|---|---|---|---|---|
| 3,400,797 A | * | 9/1968 | Horn | ...................... F16D 27/09 |
| | | | | 188/161 |
| 6,050,379 A | * | 4/2000 | Lyon | ...................... F16D 28/00 |
| | | | | 192/54.1 |

(Continued)

FOREIGN PATENT DOCUMENTS

| CN | 1129969 A | 8/1996 |
|---|---|---|
| CN | 1176352 A | 3/1998 |

(Continued)

OTHER PUBLICATIONS

International Search Report dated Feb. 2, 2015 from International Patent Application No. PCT/EP2014/075291 (with English Translation).

(Continued)

*Primary Examiner* — Stacey A Fluhart
(74) *Attorney, Agent, or Firm* — Dickinson Wright PLLC

(57) ABSTRACT

Clutch for a motor vehicle, preferably for engaging and disengaging a drivetrain for all-wheel drive vehicles, comprising a first shaft, a second shaft coaxially arranged with the first shaft, a clutch sleeve, which is displaceable in an axial direction relative to the first shaft and the second shaft and which brings about a positive coupling or decoupling of the first shaft and the second shaft, together with a coil to which current can be applied, wherein the clutch sleeve is arranged, torsionally fixed to the first shaft, and wherein the coil to which current can be applied is arranged coaxially with the axial direction, wherein the clutch sleeve to which (Continued)

current can be applied can be displaced in an axial direction through the application of current to the coil.

11 Claims, 4 Drawing Sheets

(51) Int. Cl.
*F16D 48/06* (2006.01)
*F16D 27/102* (2006.01)

(52) U.S. Cl.
CPC .... *F16D 48/064* (2013.01); *F16D 2500/1022* (2013.01); *F16D 2500/1025* (2013.01); *F16D 2500/1066* (2013.01); *F16D 2500/10431* (2013.01); *F16D 2500/7041* (2013.01); *F16D 2500/70418* (2013.01)

(56) References Cited

U.S. PATENT DOCUMENTS

| | | | |
|---|---|---|---|
| 7,175,557 B2* | 2/2007 | Kirkwood | B60K 17/3467 475/150 |
| 8,475,332 B2* | 7/2013 | Ishii | B60K 6/445 477/8 |
| 2005/0197232 A1* | 9/2005 | Matsumura | F16D 48/064 477/5 |
| 2005/0279607 A1* | 12/2005 | Fusegi | F16D 27/118 192/84.96 |

FOREIGN PATENT DOCUMENTS

| | | |
|---|---|---|
| CN | 1213049 A | 4/1999 |
| DE | 4002053 A1 | 7/1990 |
| DE | 3911122 C1 | 9/1990 |
| DE | 102011077588 A1 | 12/2012 |
| GB | 1117353 A | 6/1968 |
| WO | WO8605850 A1 | 10/1986 |
| WO | WO2011098595 A1 | 8/2011 |
| WO | WO2012048842 A1 | 4/2012 |

OTHER PUBLICATIONS

Search Report dated May 11, 2017 from corresponding Chinese Patent Application No. 2014800644026.

* cited by examiner

CLUTCH

CROSS-REFERENCE TO RELATED APPLICATIONS

This application is a U.S. National Stage of International Application No. PCT/EP2014/075291, filed Nov. 21, 2014 and which claims priority to German Application No. DE 10 2014 209 809.2 filed May 22, 2014 and German Application No. DE 10 2013 224 047.3 filed Nov. 25, 2013. The entire disclosure of each of the above listed applications is incorporated herein by reference.

FIELD OF THE INVENTION

The present invention relates to a clutch for a motor vehicle, preferably for engaging and disengaging a drivetrain for all-wheel drive vehicles, comprising a first shaft, a second shaft coaxially arranged with the first shaft, a clutch sleeve, which is displaceable in an axial direction relative to the first shaft and the second shaft and which brings about a positive coupling or decoupling of the first shaft and the second shaft, together with a coil to which current can be applied.

STATE OF THE ART

Such clutches, particularly in the form of so-called disconnect systems, can be used for coupling and decoupling parts of a drivetrain in motor vehicles having selectable all-wheel drive, so that in two-wheel drive mode the connection between the primary axle or the drive unit on the one hand and the secondary axle on the other can be disabled at least some of the time. These clutches can alternatively also be used in motor vehicles with hybrid drive to separate the main transmission from the internal combustion engine when in electric drive mode, in order thus to avoid or minimize power losses and noise, so that the energy consumption and hence the $CO_2$ emissions can be reduced. However, a drive train decoupling can also be provided for an electrical drive to the secondary axle.

DE4002053A1 describes a coupling system of the aforesaid type, in which an axle shaft can be selectively decoupled from a differential gear by means of an axially displaceable selector sleeve. When idling, it is thus possible to reduce power losses caused by the drag from differential gear components.

WO2011098595A1 discloses a coupling assembly, in which a sleeve can be displaced in an axial direction by a solenoid coil, wherein the coil via a tappet brings a nut angular segment into engagement with a threaded portion of a rotating shaft.

DE3911122C1 describes a positively interlocking shift clutch, wherein the shift clutch, for coupling a hollow shaft to a shaft journal lying coaxially therein, in which coupling balls are pressed into the positively interlocking engagement between recesses in the shaft journal and openings of the hollow shaft through axial displacement of a shift sleeve, and locking balls are pressed radially into an annular groove in axially interlocking engagement of the hollow shaft in relation to the shift sleeve through axial displacement of a locking sleeve. The shift clutch comprises a coil carrier, coaxially formed with the shaft and having a holding winding and a shift winding, wherein the shift winding is energized for coupling a shift ring to a rotating shaft. The holding winding, which generates a weaker magnetic field than the shift winding is energized in order to hold the shift ring in its position.

SUMMARY OF THE INVENTION

The object of the invention is to provide such a clutch in an improved form compared to the known solutions, which is on the one hand cost-effective and on the other of compact construction, whilst at the same affording greater working reliability.

This object is achieved by the features of claim 1. Further developments of the invention form the subject matter of the dependent claims. The object is achieved by a clutch for a motor vehicle, preferably for engaging and disengaging a drivetrain for all-wheel drive vehicles, comprising a first shaft, a second shaft coaxially arranged with the first shaft, a clutch sleeve, which is displaceable in an axial direction relative to the first shaft and the second shaft and which brings about a positive coupling or decoupling of the first shaft and the second shaft, and a coil to which current can be applied, wherein the clutch sleeve is arranged, torsionally fixed to the first shaft, wherein the coil to which current can be applied is arranged coaxially with the axial direction, wherein the clutch sleeve can be displaced in an axial direction through the application of current to the coil.

According to the invention a clutch sleeve, which is intended for connecting and/or separating the two shafts, is arranged between the first shaft and the second shaft.

The clutch sleeve is displaceable in an axial direction of the two coaxially arranged shafts, wherein the connection of the two shafts is preferably a positively interlocking connection.

In the context of the present invention the specified directions "axially" and "radially" always relate to the axial direction of the two shafts.

In the following the term "system" should be understood to mean the clutch according to the invention.

The clutch sleeve can be actuated by means of an energizable coil. Here, the coil is arranged in an annular shape coaxially with the two shafts. This solution affords a particularly compact clutch construction.

The clutch sleeve is arranged, torsionally fixed to the first shaft. This affords an especially simple and therefore cost-effective clutch construction with increased working reliability compared to clutches which produce a torsionally fixed construction only when the need arises.

In a basic position, the clutch sleeve may be situated either in the closed state or in the open state, depending on whether a coupled or decoupled system is desired in the basic position.

Developments of the invention are specified in the dependent claims, the description and in the drawings attached.

According to the invention, an annular spring is provided coaxially with the axial direction and brings the clutch sleeve into the basic position and into one of a coupled or decoupled position, depending on how the system is formed. Alternatively, multiple springs may also be provided.

Here, the spring on a first side is supported on the first shaft by a stop arranged on the first shaft. On the second side, the spring is supported against a first end face of the clutch sleeve and when the coil is not energized presses this sleeve into the basic position. The first end face of the clutch sleeve here faces the stop on the first shaft.

In one embodiment according to the invention at least the one spring is arranged, torsionally fixed to the first shaft.

In a preferred embodiment, the clutch sleeve comprises a gate track on at least some portions of the outer circumference. Here, the gate track, at least in an axial direction, comprises a portion which corresponds to the desired axial displacement length of the clutch sleeve.

The term gate track may be taken to mean any geometry which allows an axial displacement of the clutch sleeve. For example, the gate track may also be a thread or a helically running groove.

In a preferred embodiment, the gate track is embodied as a depression in the clutch sleeve. Here, the gate track may have a pitch which according to the invention allows the desired displacement in an axial direction in a defined time.

A nut angular segment, which can be actuated by means of a coil to which current can be applied, is capable of engaging in the gate track. The nut angular segment is here geometrically formed so that it can engage in a defined manner in the gate track of the clutch sleeve. In order to be able to achieve a better force distribution, in a preferred embodiment at least one further nut angular segment may be provided, the nut angular segments being arranged symmetrically.

At least the one nut angular segment here comprises one or more mating elements, embodied as a thread, for example, with corresponding thread serrations, which are capable of engaging in the gate track of the clutch sleeve.

In one embodiment according to the invention, at least the one nut angular segment is permanently connected to a lever. Here, in a preferred embodiment, the nut angular segment is welded or adhesively bonded to the lever.

The nut angular segment can be brought into engagement with the gate track of the selector sleeve by the lever.

The lever and the nut angular segment are formed so that they are magnetically conductive. It is also possible, however, for just the lever alone to be magnetically conductive and for the nut angular segment to be made from a magnetically non-conductive material.

In a preferred embodiment, the lever is integrally formed with a coil holder. The lever here may be embodied as a spring which is elastically deformed in the direction of the clutch sleeve when the coil is energized and which, if anything, is able to rotate only partially, if at all.

The nut angular segment permanently connected to the lever is here moved together with the lever.

When the coil is shut off, the lever is moved back into the basic position by the spring force of the lever embodied as a spring, and the nut angular segment is lifted out of the gate track of the clutch sleeve, and the axial longitudinal displacement of the clutch sleeve is terminated.

In a further embodiment according to the invention, the lever may be formed so that it is capable of pivoting on the coil holder, so that on energizing of the coil it swivels in the direction of the clutch sleeve. The lever here may turn about a fixed axis in the coil holder, but it may also be formed with a cam, allowing the lever to roll. A small spring is arranged so that when the coil is not energized the spring holds the lever with the nut angular segment into the basic position or brings it back to this position.

The coil to which current can be applied is arranged in the coil holder. In one embodiment according to the invention, the coil is permanently connected to the coil holder. Situated in the coil holder is at least one aperture, through which a wiring intended for energizing the coil passes.

In order to allow the rotary motion of the clutch sleeve, rotating together with the first shaft, to be translated into a translational motion, in one embodiment according to the invention the coil holder and therefore also the nut angular segment are supported, torsionally fixed to a housing accommodating the clutch.

On energizing of the coil, the lever with the nut angular segment is pressed into the gate track of the clutch sleeve by the magnetic force generated by the coil. Here at least the lever forms a part of the magnetic circuit.

In the open position of the system, the magnetic flux M1 generated by the energized coil runs primarily via the lever and the nut angular segment to the clutch sleeve and from there via the coil holder back to the lever.

Since the coil holder is fixed to the housing and the nut angular segment has been brought into engagement with the gate track, the clutch sleeve is now displaceable in an axial direction.

The magnetic flux here runs partially through the return components fixed to the housing, such as the coil holder, through movable elements, for example the lever, and through rotating parts such as the clutch sleeve.

In a further embodiment according to the invention, the magnetic flux is made to bypass the frictional contact of the nut angular segment and the gate track on a parallel path, so that magnetic particles cannot collect, or cannot collect as heavily in the gate track.

Two differently formed magnetic fluxes M1 and M2 are feasible or dominant, depending on the position of the clutch sleeve.

The magnetic fluxes M1 and M2 serve firstly for decoupling the two shafts and keeping them in the opened state. During the translational displacement of the clutch sleeve the magnetic fluxes vary in as much as the magnetic flux M1 dominant during the disconnect process becomes weaker and the magnetic flux M2 becomes more dominant when the end position of the clutch sleeve is reached. The magnetic flux M1 is primarily led via the lever and the nut angular segment to the clutch sleeve and from there via the coil holder to the lever.

In the open position of the system, that is to say when the clutch sleeve has separated the two shafts from one another, the clutch sleeve is in contact with or in proximity to an armature disk arranged, torsionally fixed to the first shaft. The armature disk, which is likewise magnetically conductive, is drawn in the direction of the lever by the magnetic flux when the lever enters the area of the armature disk and thereby forms a part of the magnetic circuit. The armature disk here is formed so that it can lift the nut angular segment out of the gate track, and the clutch sleeve is held in its end position. In this end position the magnetic flux M2 is dominant, so that the displacement of the clutch sleeve in an axial direction is terminated and the magnetic flux via the nut angular segment is interrupted.

In a further inventive embodiment, the gate track has a suitable geometry out of which the nut angular segment can be lifted. Where the gate track is designed as a thread, the clutch sleeve has a thread runout. The axial force between the clutch sleeve and the armature disk here is so great that the nut angular segment can be lifted out of the thread runout whilst not under load.

During the displacement of the clutch sleeve, the magnetic flux changes its primary direction due to the diminishing air gap between the clutch sleeve and the armature disk. On reaching the end position, the magnetic flux runs via the nut angular segment or the return component fixed to the housing, and the armature disk. When the nut angular segment is lifted out of the gate track, the magnetic flux runs primarily via the armature disk, the clutch sleeve and the return component.

The magnetic flux M2 now running via the armature disk is so strong here that it can hold the clutch sleeve in the position against the force of the spring. This position is held as long as a corresponding holding current flows in the coil. When the holding current is shut off, the clutch sleeve is pressed or drawn into the basic position by the force of the spring.

The holding current here is lower than that current required to open or close the connection between the first shaft and the second shaft.

When the clutch sleeve is to be brought back into a basic position, for example in order to connect the two shafts to one another again, the magnetic field must be removed. This can be done by shutting off the current, or more rapidly by briefly increasing an inverse potential.

Sensors are required only for diagnostic functions, not for regulating or controlling the system.

In order to be able to check the movement of the clutch sleeve when closing the clutch, damping is provided on the second shaft. This damping may be in pneumatic, hydraulic or mechanical form.

In a further embodiment according to the invention the clutch sleeve, the first shaft and/or the second shaft, at least in portions, may have a splined-shaft, splined, square-toothed or serrated tooth system, wherein the clutch sleeve has an internal tooth system and the first shaft and/or the second shaft have an external tooth system corresponding to the internal tooth system of the clutch sleeve. The clutch sleeve is connected, torsionally fixed to the first shaft by the tooth system and on energizing of the coil can be displaced by this in an axial direction in order to connect the first shaft to the second shaft or to separate it therefrom.

According to the invention, the second shaft has the same tooth system as the first shaft. This embodiment is particularly easy to implement and is cost-effective, since additional components, for example a shift fork, can be dispensed with. A further advantage is that a high and variable torque can reliably be transmitted between the first shaft and clutch sleeve.

Under longitudinal displacement the clutch sleeve, with the aid of a synchronizing device, for example in the form of synchronizer rings arranged with ratchet teeth, is capable of connecting the first shaft to the second shaft.

It is to be noted that, as alternatives to the energizing of the coil, pneumatic or hydraulic actuating devices may also be used. The clutch sleeve is displaceable through the accumulating pressure of a suitable medium acting on an end face, which functions as piston face.

BRIEF DESCRIPTION OF THE DRAWINGS

The invention is described below by way of example, referring to the drawings.

DETAILED DESCRIPTION OF THE INVENTION

Figure 1:
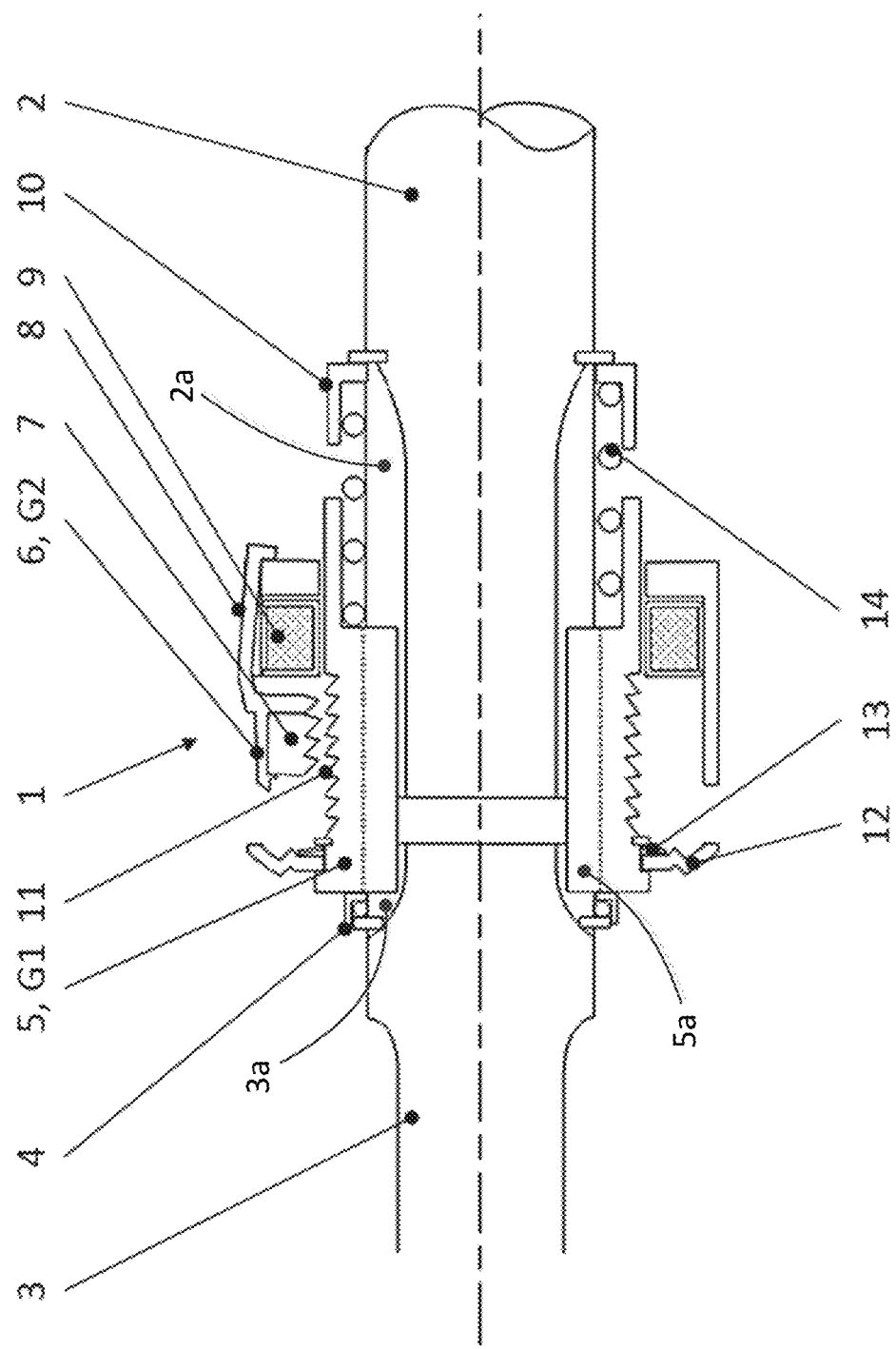
FIG. 1 shows a simplified side view of an inventive clutch according to an embodiment of the invention, wherein the clutch sleeve is in the basic position.

FIG. 1 represents a simplified side view of a clutch 1, wherein the clutch 1 substantially comprises a first shaft 2 and a second shaft 3, together with a clutch sleeve 5 for connecting the two shafts. Here the clutch sleeve 5 and the two shafts, at least in portions, preferably have serrated or splined tooth systems, by means of which said components are/can be connected to one another. As shown, the first shaft 2 has an external tooth system 2a, the second shaft 3 has an external tooth system 3a, and the clutch sleeve 5 has an internal tooth system 5a. The clutch sleeve 5 comprises a gate track 11, which is represented as a threaded portion, in which a nut angular segment 7 can engage. The nut angular segment 7 may have one or more serrations arranged in series, which can be brought into engagement with the threaded portion of gate track 11. The nut angular segment 7 is connected to a lever 6, which is integrally formed with a coil holder 8. The coil holder 8 has at least one aperture, through which a wiring for energizing a coil 9 passes (not represented). The lever 6 is formed so that it acts like a spring, and when the coil 9 is not energized it brings the lever 6 and the nut angular segment 7 connected thereto back into a basic position G2. The energizable coil 9 is arranged in the coil holder 8. A stop 10, on which a spring 14 is supported by one end, is arranged on the first shaft 2. The spring 14 is arranged coaxially on the first shaft 2 and is supported at the other end on a first end face of the clutch sleeve 5. In FIG. 1, the clutch sleeve 5 is shown in a basic position G1.

Figure 2:
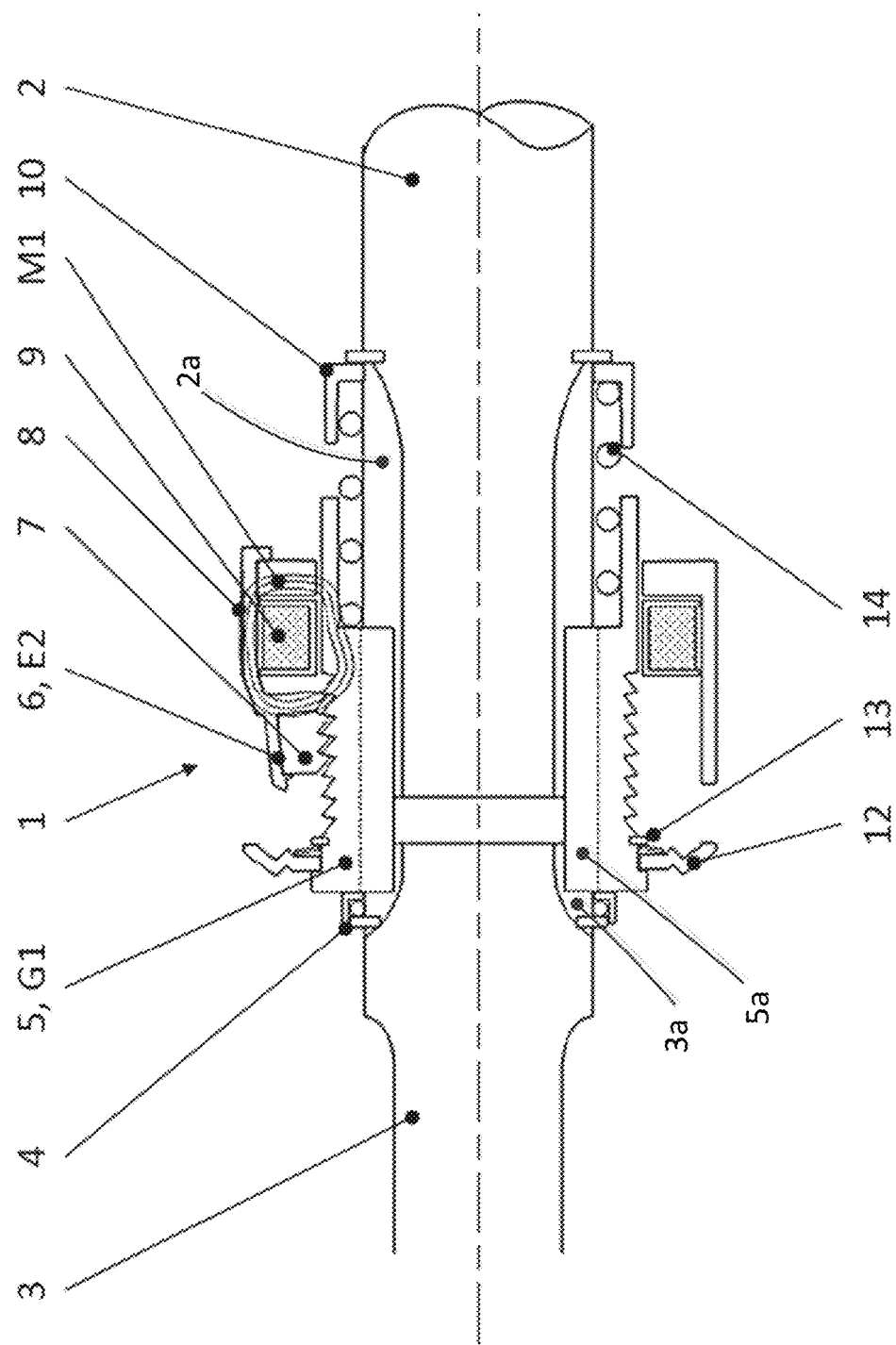
FIG. 2 shows a further side view of the clutch according to FIG. 1, wherein the nut angular segment is in engagement with the gate track of the clutch sleeve.

In FIG. 2, the coil 9 is energized. The magnetic flux M1 runs through the lever 6, via the nut angular segment 7 and the clutch sleeve 5 to the coil holder 8, where it finishes at the lever 6. Due to the forces occurring in the magnetic flux, the one or more serrations on the nut angular segment 7 are pressed by the lever 6 into the threaded portion of the clutch sleeve 5. As such, the nut angular segment 7 is located in an engagement position E2. The coil holder 8 is supported, torsionally fixed in a housing (not shown) accommodating the clutch 1. When the angular nut segment 7 engages in the clutch sleeve 5, which also rotates, the rotational motion of the first shaft 2 is thereby translated into a translational motion of the clutch sleeve 5, with the result that the clutch sleeve 5 moves from the basic position G1 toward an end position E1.

Figure 3:
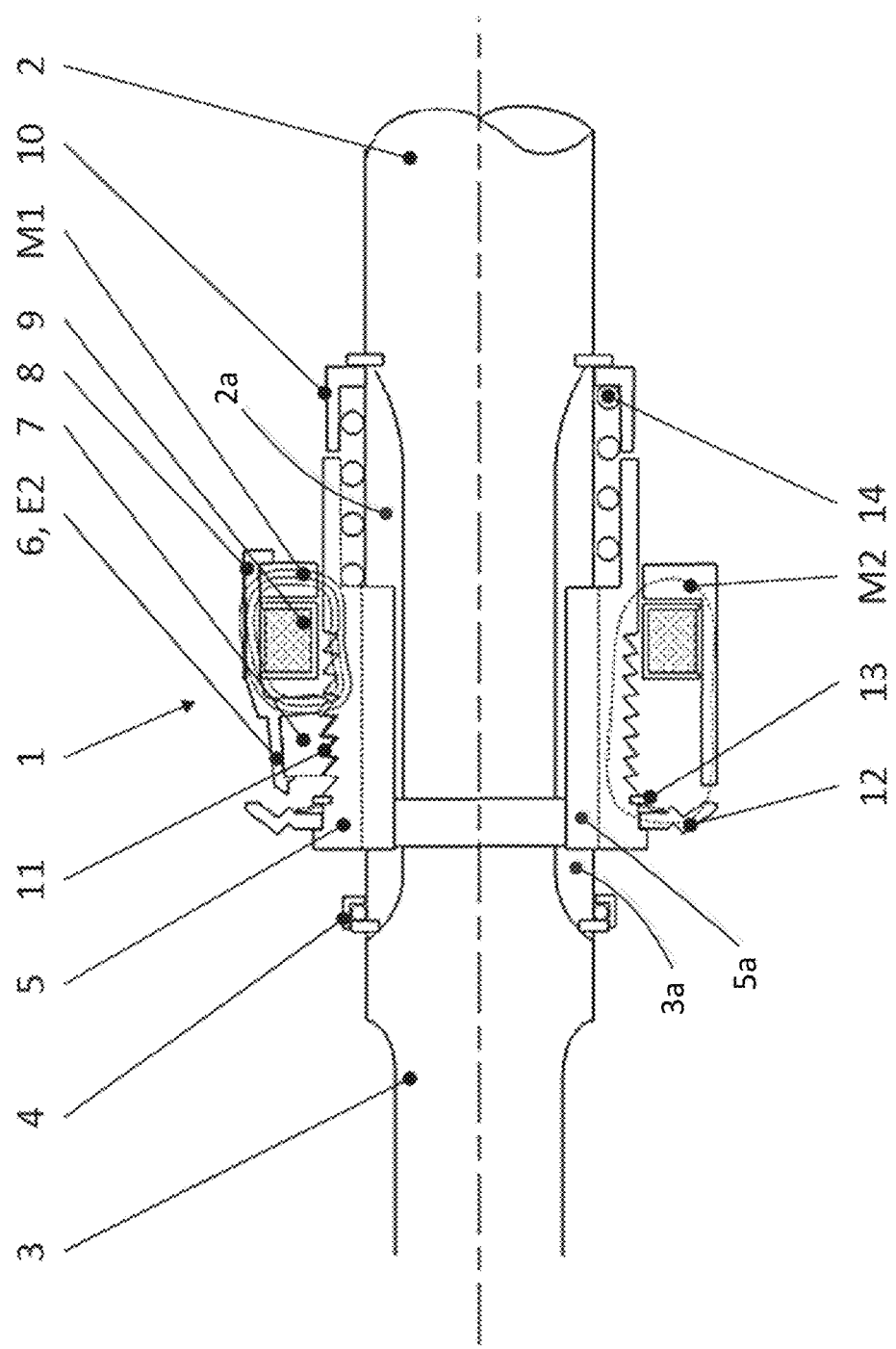
FIG. 3 shows a further side view of the clutch according to FIG. 1, wherein the clutch sleeve is being displaced into the end position.

In FIG. 3, the clutch sleeve 5 is shown moving in the direction of the end position E1. At one end of the clutch sleeve 5 an armature disk 12 is arranged, torsionally fixed to the clutch sleeve 5. The magnetic flux M1, M2 has different forms, varying as a function of the position of the clutch sleeve 5. In a first form, the magnetic flux M1 runs as already described in FIG. 2. In a second form, the magnetic flux M2 starts to run via the armature disk 12, the clutch sleeve 5 being held in the end position by the magnetic flux M2.

Figure 4:
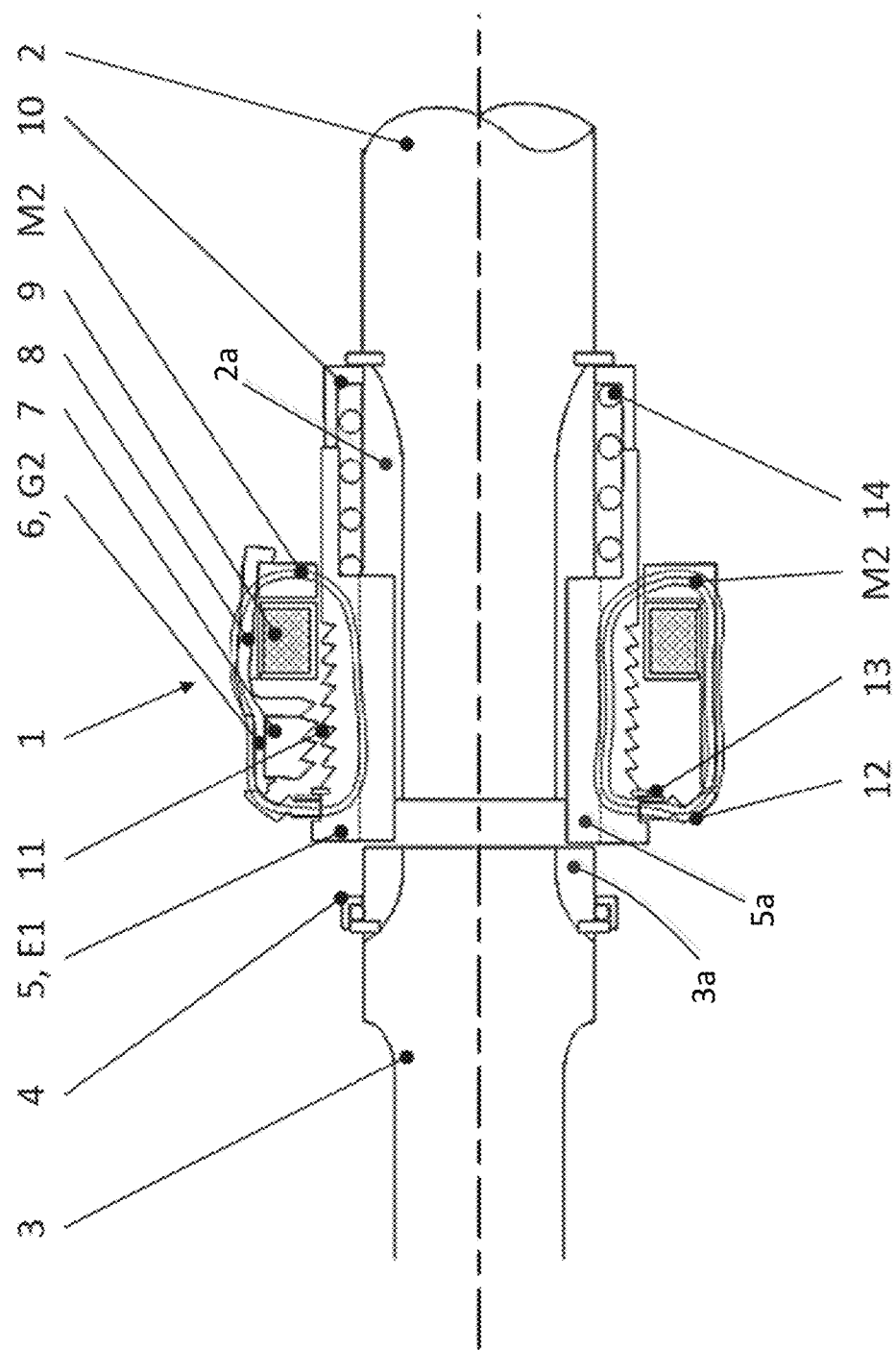
FIG. 4 shows a further side view of the clutch according to FIG. 1, wherein the clutch sleeve is in the end position.

As shown in FIG. 4, the clutch sleeve 5 is situated in the end position E1. The clutch sleeve 5 is in contact with the armature disk 12, the armature disk 12 being formed so that it lifts the lever 6 and therefore the nut angular segment 7 out of the gate track 11, with the result that the magnetic flux M1 via the nut angular segment 7 is interrupted and now flows only via the armature disk 12, so that the magnetic flux M2 takes on its second form. Lifting the nut angular segment 7 out of the threaded portion of the clutch sleeve 5 terminates the translational motion, a damping being provided on the second shaft 3 which is intended to check the motion of the clutch sleeve 5 as the clutch 1 closes. The damping 4 may be pneumatic, hydraulic or mechanical, as in this exemplary embodiment. A resilient element, preferably a disk spring 13, which serves to separate the nut angular segment 7 more rapidly from the threaded portion of the clutch sleeve 5 when the clutch 1 is in the opened state, is arranged on the armature disk 12. At the end of the disconnect movement, that is to say on opening of the clutch 1, the disk spring 13 is pre-tensioned and presses against the nut angular segment 7. The lever 6 or the nut angular segment 7 is thereby pushed out of the threaded portion of the clutch sleeve 5 by a small pulse. Once the end position E1 is reached, the current flowing through the coil 9 can be reduced to a smaller holding current, in order to hold the clutch sleeve 5 in its end position E1. When the clutch sleeve 5 is to be returned into the basic position G1, the energization of the coil 9 is terminated and the spring presses the clutch sleeve 5 back into the basic position G1, and the two shafts are again connected to one another, as represented in FIG. 1.

LIST OF REFERENCE NUMERALS

1 clutch
2 first shaft
3 second shaft
4 damping
5 clutch sleeve
6 lever
7 nut angular segment
8 coil holder
9 coil
10 stop
11 gate track
12 armature disk
13 disk spring
14 spring
E1 end position
E2 engagement position
G1 basic position
G2 basic position
M1 magnetic flux
M2 magnetic flux

The invention claimed is:

1. A clutch for a motor vehicle, for engaging and disengaging a drivetrain for all-wheel drive vehicles, comprising a first shaft, a second shaft coaxially arranged with the first shaft, a clutch sleeve, which is displaceable in an axial direction relative to the first shaft and the second shaft and which brings about a positive coupling or decoupling of the first shaft and the second shaft, and a coil to which current can be applied, wherein the clutch sleeve is arranged, torsionally fixed to the first shaft, wherein the coil to which current can be applied is arranged coaxially with the axial direction, wherein the clutch sleeve can be displaced in an axial direction through the application of current to the coil, wherein the clutch sleeve can be brought back into a coupled or decoupled basic position (G1) by a spring acting coaxially with the axial direction, wherein the clutch sleeve comprises a gate track on at least some portions of the outer circumference, and wherein a nut angular segment, which can be actuated by the coil to which current can be applied, is capable of engaging in the gate track of the clutch sleeve.

2. The clutch as claimed in claim 1, wherein the nut angular segment is permanently connected to a lever.

3. The clutch as claimed in claim 2, wherein the nut angular segment can be brought into engagement with the gate track of the clutch sleeve by the lever.

4. The clutch as claimed in claim 3, wherein the lever is integrally formed with a coil holder.

5. The clutch as claimed in claim 4, wherein the lever is arranged so that it can pivot or roll on the coil holder, wherein a spring holds the lever with the nut angular segment in a basic position (G2) or brings it back into this position when the coil is not being actuated.

6. The clutch as claimed in claim 4, wherein the coil to which current can be applied is arranged in the coil holder.

7. The clutch as claimed in claim 4, wherein the coil holder is supported, torsionally fixed to a housing accommodating the clutch.

8. The clutch as claimed in claim 4, wherein the nut angular segment can be pressed into the gate track of the clutch sleeve directly by the magnetic force generated by the coil to which current can be applied.

9. The clutch as claimed in claim 4, wherein two different magnetic fluxes (M1, M2) are achievable, depending on the position of the clutch sleeve relative to the coil holder.

10. The clutch as claimed in claim 1, wherein an armature disk is arranged at one end of the first shaft, wherein the armature disk in an end position (E1) of the clutch sleeve is capable of lifting the nut angular segment out of the gate track.

11. The clutch as claimed in claim 1, wherein the clutch sleeve, the first shaft and/or the second shaft, at least in portions, have a splined shaft system, splined tooth system, square-tooth system or serrated tooth system.

* * * * *